Oct. 1, 1929.    L. BRADLEY ET AL    1,730,315
BLEACHED CHEMICAL WOOD PULP AND PROCESS OF MAKING
Filed May 19, 1921
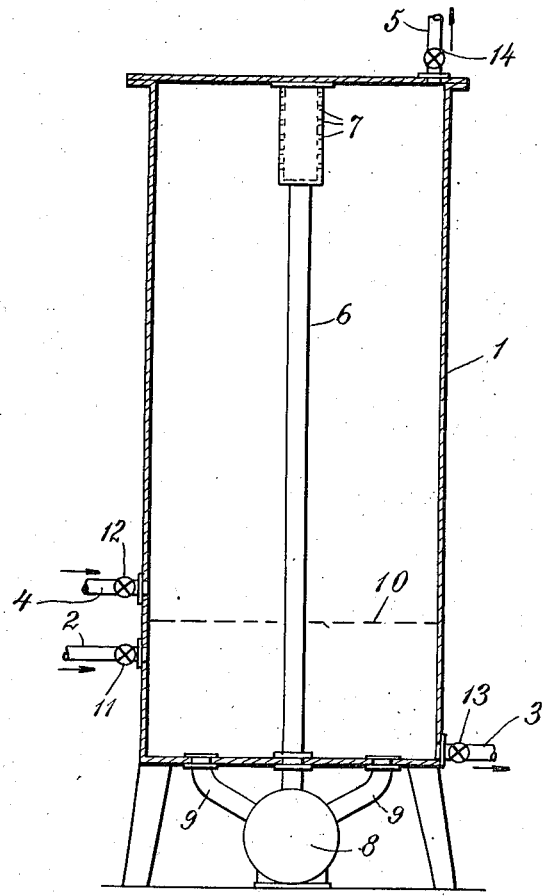
INVENTOR
Linn Bradley and
BY Edward P. McKeefe
Pennie, Davis, Marvin & Edmonds
ATTORNEYS Patented Oct. 1, 1929

1,730,315

UNITED STATES PATENT OFFICE

LINN BRADLEY, OF MONTCLAIR, NEW JERSEY, AND EDWARD P. McKEEFE, OF NEW YORK, N. Y., ASSIGNORS TO BRADLEY-McKEEFE CORPORATION, OF NEW YORK, N. Y., A CORPORATION OF NEW YORK

BLEACHED CHEMICAL WOOD PULP AND PROCESS OF MAKING

Application filed May 19, 1921. Serial No. 470,961.

The present invention relates to an improved method and apparatus for the bleaching of pulp, as well as to the improved bleached pulp thus produced.

In the production of chemical pulp, the chipped wood is commonly digested under pressure with a chemical solution, the common pulp processes being the sulfite process, the sulfate process, and the soda process. During the digestion, the cellulose of the wood is largely freed from non-cellulosic substances which go into solution. At the end of the digestion, the liquor is separated from the cellulose fibre or pulp, the resulting pulp washed from adhering liquor, and then taken up with water to form the pulp stock which, in common practice, contains only a small amount of cellulose material in a large amount of water, e. g., 4% of stock (dry basis) in 96% of water. The pulp, even with its large water content, is nevertheless relatively thick. This pulp is commonly subjected to bleaching with a bleach liquor made from bleaching powder or from milk of lime and chlorine or from sodium hypochlorite, the bleaching operation being commonly carried out in the beater, and the bleached pulp being then used for its intended purpose, for example, for the production of paper.

When paper pulp is thus bleached with a bleach liquor made from bleaching powder, or from milk of lime and chlorine, the bleached pulp has an increased ash content, made up largely of calcium compounds. The ash content of the bleached stock may thus amount to as much as 1% or more, and will be somewhat greater than the ash content of the unbleached pulp.

Free chlorine, which can be supplied, for example, in the form of liquid chlorine in cylinders, presents a valuable form of chlorine for bleaching, but free chlorine cannot be used in the ordinary beater without unexpected difficulties. We have thus observed that, if chlorine or chlorine water is added to the beater, it is practically impossible to obtain a permanent bleaching of the pulp, and, after investigation, we have found that the chlorine, or hydrochloric acid produced therefrom, attacks the iron and copper of the beater and brings into solution more or less iron and copper, which readily oxidizes and causes discoloration of the pulp. Increased amounts of the chlorine or chlorine water only serve to increase this objectionable iron contamination and discoloration.

We have found, however, that the pulp can be bleached directly with chlorine, in a simple and advantageous manner, by carrying out the bleaching operation in apparatus resistant to the action of chlorine and hydrochloric acid, and by bringing the pulp into intimate contact with the chlorine in gaseous form.

In the practice of the present invention, we make use of gaseous chlorine, which can be supplied, for example, in the form of liquid chlorine in cylinders, and we introduce the chlorine directly into the stock so that the water of the stock is used for absorbing the chlorine, and so that the production of a separate body of chlorine water and its addition to the stock, with resulting dilution, made unnecessary.

An apparatus embodying the invention and adapted for the practice of the process of the invention is illustrated in the accompanying drawings, in which Figure 1 shows a vertical sectional view of the apparatus.

The apparatus comprises a vertically disposed tower-like closed vessel 1 of any suitable acid resistant material adapted to contain a predetermined operating depth of pulp as indicated by the line 10. A gas feed inlet pipe 4 operated by a valve 12 is provided in the vessel 1 just above the pulp level 10, and a gas outlet pipe 5 controlled by a valve 14 is provided for withdrawing gas from the vessel. The vessel 1 is provided also with a pulp inlet pipe 2 controlled by a valve 11 just below the normal operating pulp level, and with a pulp outlet pipe 3 controlled by a valve 13 near the bottom of the vessel. Suspended within the vessel 1 is a pipe 6 of suitable acid resistant material operatively connected at its lower end to a pump 8 having intake arms 9. Near the top of the pipe 6 a plurality of orifices or nozzles 7 are provided adapted to discharge pulp elevated within the pipe 6 outwardly and downwardly within the vessel and against its walls.

A suitably prepared fiber pulp is introduced into the vessel 1 until a predetermined level 10 is reached. The pump 8 is then put in operation and elevates within the pipe 6 a body of pulp which is discharged through the nozzles 7 against the walls of the vessel 1 and down through the space above the pulp level in the form of a spray, the space above the pulp level being previously filled with a gaseous bleaching agent, such as chlorine gas, by admission through the gas inlet pipe 4. A continuous circulation of the pulp is thereby maintained through the pump 8, outlet 6, and back to the main body of fiber pulp. After treatment for an appropriate period of time, the pulp may be withdrawn through the pulp outlet pipe 3 for subsequent treatment.

The apparatus of the present invention is made of inert material, such as acid resistant stoneware. In the preferred embodiment of the invention, a pump is provided for the circulation of the stock and this stock is discharged in the form of a rain or spray into an atmosphere of the chlorine gas so that a large surface is exposed to the action of the gas. By spraying or splashing the stock into a large chamber containing the chlorine gas, the stock will be broken up into fine particles and the chlorine gas will be brought into intimate contact therwith, so that it can act upon the large exposed moist surface of the particles contained in the stock. The receptacle into which the stock is sprayed or showered should also be of stoneware or other acid-resistant material and should be free from iron.

The stock can be recirculated one or more times through the atmosphere of chlorine gas, or it can be passed through successive towers in each of which it is sprayed or showered through the chlorine atmosphere; and the amount of chlorine, contained in the successive towers can be regulated, and the bleaching effect thereby varied. The bringing about of the intimate contact of the pulp particles with the chlorine gas permits the water of the stock to absorb a limited amount of the chlorine which is thus carried down into the body of stock collecting at the bottom of the tower, so that the bleaching action may be continued even after the pulp has passed through the chlorine atmosphere.

It is a characteristic advantage of the present process that it causes the bleaching to take place rapidly and in practically a minimum period of time, as well as in a substantially uniform manner throughout the entire body of the stock.

The particular manner of spraying or showering the stock into the chlorine gas can be considerably varied. The stock may thus be pumped through a suitable destributing nozzle or pipe or discharged against a splash distributor, or fed in the form of small streams which break up into drops, or broken up with a blast of compressed gas, such as compressed chlorine or a mixture of chlorine and diluent gas. So also, the size and shape of the tower can be widely varied. By using extra high towers, a correspondingly prolonged time of contact is provided between the stock particles and the gaseous atmosphere.

At the end of the bleaching operation, the stock can be subjected to a vacuum to assist in liberating any excess chlorine which the stock contains, and this liberated chlorine can be reused in the treatment of further amounts of pulp. An excess of chlorine over and above that necessary for the actual bleaching may thus be used, and the excess withdrawn from the stock soon after its treatment, so that prolonged action of the excess chlorine upon the stock will be avoided.

It will be evident that, inasmuch as the chlorine is used in gaseous form, the apparatus should be closed, and the circulation of the pulp carried out in a closed system.

Instead of spraying the stock into a chlorine atmosphere, the stock may be otherwise treated with the chlorine gas to bring about the necessary intimacy of contact, or the spraying operation can be supplemented by the introduction of chlorine directly into the pulp body; but we regard the spraying or showering of the stock through the chlorine atmosphere as a particularly advantageous method of bleaching because of the relatively enormous surface which can thus be exposed to the bleaching action.

Owing to the intimacy of reaction of the chlorine upon the stock, the bleaching can be carried out with the use of a much smaller amount of chlorine than is now commonly used in bleaching operations. So, also, the use of lime or other reagents for combining with the chlorine is made unnecessary, as well as the provision of absorption towers and the like for bringing about a preliminary absorption of the chlorine gas in the liquor to be used as a bleaching liquor or in water which is to be added to the stock as chlorine water. These extra operations are thus eliminated, and the water of the stock itself is used for the absorption of the chlorine.

Instead of showering or spraying the pulp into an atmosphere of chlorine, it may be caused to flow down over baffles or surfaces which break up the pulp into thin streams and which present large surfaces of it to the bleaching action of the chlorine.

By treating chemical pulp with chlorine in the manner above described, we have found that its ash content is not increased, and can even be greatly decreased. The ash content can thus readily be reduced to below .05% and we have obtained as low as .006% of ash in the bleached product.

In the soda pulp process, the unbleached pulp produced is relatively low in ash and most of the silica has been removed. The unbleached sulfite pulp, on the other hand, may still contain appreciable amounts of silica. The hydrochloric acid formed from the chlorine during the bleaching operation, to a considerable extent dissolves and carries away in the process of washing a portion of the inorganic material commonly present, but any silica contained in the pulp is relatively resistant. For the purpose of reducing the silica content of such fibres as contain it, we add a compound of fluorine sufficient to combine with the predetermined quantity of silica in the fibre to form hydrofluosilicic acid which will thus be separated from the fibre. The compound of fluorine will be itself decomposed during the bleaching operation and will act upon the silica and thus free the fibres from it. Stock which is treated in this way will be substantially free from silica as well as from other inorganic material.

The chlorine gas can be brought into intimate contact with the pulp by introducing it into the pump by which the pulp is circulated, so that the chlorine gas and pulp will be broken up and intimately intermixed with each other while the pulp is passing through the pump and through the discharge conduit therefrom. The intimacy of intermixture of the chlorine and pulp which can thus be brought about can replace, to a greater or less extent, or can supplement, the bleaching operation carried out in the tower through which the pulp is sprayed or showered.

The process of the present invention presents the advantage that the bleaching of the cellulose fibre and the reduction of its ash content can be carried out without the use of outside heat, and at ordinary temperatures such as prevail in the pulp mill, the process thus being an economical one to practice. The stock can be brought up to color in a relatively short period of time, the bleaching being promoted by the removal of any incrusting salts which might protect the fibres and coloring matter from the action of the bleaching agent. Owing to the carrying out of the process in the cold, the losses of cellulose during bleaching are correspondingly reduced, while the more economical action of the bleaching agent is secured.

The cellulose bleached according to the present invention is of such a high purity and has such marked qualities that it is available for use where an exceedingly pure cellulose is required, for example, for nitration, for the production of nitro-cellulose explosives or nitro-cellulose plastics, collodion, cellulose acetate, viscose, etc. The cellulose is soft and contains even less inorganic material than supposedly pure cotton cellulose. The fibre produced from ordinary sulfite pulp, by treatment according to the present invention, becomes soft and free from calcium salts and has much the feel and texture of cellulose produced from poplar wood by the soda process.

We claim:—

1. The method of bleaching chemical pulp from wood which comprises bringing the pulp while in a flowing condition and containing only a small amount of cellulose material in a large amount of water directly into contact with gaseous chlorine, whereby the chlorine is absorbed by the water in the pulp, and permitting the pulp to flow through an atmosphere of chlorine gas.

2. The method of bleaching chemical pulp from wood which comprises introducing the pulp stock while in a flowing condition and containing only a small amount of cellulose material in a large amount of water into contact with an atmosphere of chlorine gas, the flowing pulp being finely subdivided in said atmosphere to expose a large surface to the chlorine gas.

3. The method of bleaching chemical pulp from wood which comprises spraying or showering the pulp in a finely divided state into an atmosphere of chlorine gas, whereby the chlorine is brought into intimate contact with the fine pulp particles.

4. The method of bleaching chemical pulp from wood which comprises subjecting the flowing pulp containing only a small amount of cellulose material in a large amount of water to a showering or spraying treatment whereby the flowing pulp is finely subdivided and passing the finely subdivided pulp by gravity through an atmosphere of chlorine gas, the operation being repeated one or more times if necesssary to complete the bleaching operation.

5. The method of bleaching chemical pulp from wood, which comprises showering or spraying the pulp in a finely divided state into an atmosphere of chlorine gas, and removing any excess chlorine from the bleached pulp.

6. The method of bleaching chemical pulp from wood, which comprises subjecting the pulp to the action of chlorine and a fluorine compound adapted to effect the removal of silica, whereby the pulp is freed from silica.

7. The method of bleaching chemical pulp from wood, which comprises admixing therewith a compound of fluorine adapted to effect the removal of silica in the presence of an acid solution of chlorine and bringing the pulp in subdivided state into intimate contact with chlorine.

8. The method of bleaching chemical pulp from wood which comprises subjecting the same to the action of a bleaching agent in the presence of an acidic solution containing a soluble fluorine compound adapted to effect the removal of silica during the bleach.

9. The method of bleaching chemical pulp from wood, which comprises showering or spraying the pulp in a finely divided state into an atmosphere of chlorine gas, and preventing the contamination of the pulp during treatment with impurities tending to color the pulp.

10. The method of bleaching unbleached sulfite pulp containing appreciable amounts of silica, which comprises subjecting the same to the action of chlorine in the presence of an acidic solution containing a soluble fluorine compound adapted to effect the removal of silica under the conditions of the bleaching.

11. The method of bleaching sulfite pulp which comprises subjecting the same in a finely subdivided state to the action of chlorine gas in the presence of an acidic solution containing a soluble fluorine compound.

12. The method of bleaching chemical pulp from wood which comprises treating the pulp while in a flowing condition and containing only a small amount of cellulose material in a relatively large amount of water with chlorine gas in an apparatus resistant to the action of chlorine and hydrochloric acid, and interspersing the chlorine and pulp so that a relatively large surface of the pulp is exposed to the chlorine gas.

13. The method of bleaching chemical pulp from wool which comprises spraying or showering the pulp in a finely divided state into an atmosphere of chlorine gas, whereby the chlorine gas is brought into intimate contact with the pulp particles and the pulp being protected from contamination by contact with material subject to attack by chlorine or hydrochloric acid until said pulp is substantially freed from chlorine and hydrochloric acid.

14. As a new product, bleached chemical wood pulp comprised essentially of cellulosic fibres of such chemical composition, degree of purity and physical condition that the pulp is suitable for conversion into so-called artificial silk by the viscose process, such bleached chemical wood pulp being obtainable by a process comprising the following steps, to wit:—digesting wood chips with a cooking liquor containing an acid sulfite so as to obtain unbleached chemical wood pulp; washing unbleached chemical wood pulp derived from such wood chips; subjecting the washed unbleached chemical wood pulp to a bleaching treatment including the step of suspending the fibres thereof in a large volume of water containing sodium fluoride and showering the suspension into an atmosphere of chlorine gas while the latter is contained in an acid-resistant chamber; removing the bleached fibres from the bleach residues; and subsequently washing the bleached chemical wood pulp; such process for the treatment of the pulp being carried out under conditions adapted to substantially prevent contamination of the pulp with calcium compounds and iron compounds.

15. As a new product, bleached chemical wood pulp as described in claim 14, such pulp being substantially free from calcium compounds and iron compounds.

16. As a new product, bleached chemical wood pulp as described in claim 14, such pulp having an ash content of less than .05%.

17. As a new product, bleached chemical wood pulp as described in claim 14, such pulp being substantially free from siliceous matter.

In testimony whereof we affix our signatures.

LINN BRADLEY.
EDWARD P. McKEEFE.